United States Patent
Gassen et al.

[11] Patent Number: 5,996,959
[45] Date of Patent: *Dec. 7, 1999

[54] VIBRATION DAMPER

[75] Inventors: Achim Gassen, Köln; Helmut Vossenkuhl, Cologne; Wolfgang Koos, Aachen, all of Germany

[73] Assignee: Continental Aktiengesellschaft, Hanover, Germany

[ * ] Notice: This patent is subject to a terminal disclaimer.

[21] Appl. No.: 09/208,295

[22] Filed: Dec. 9, 1998

Related U.S. Application Data

[63] Continuation of application No. 08/523,950, Sep. 6, 1995, Pat. No. 5,884,892.

[30] Foreign Application Priority Data

Sep. 6, 1994 [DE] Germany .................................. 4431772

[51] Int. Cl.⁶ .................................................. F16M 13/00
[52] U.S. Cl. ...................... 248/635; 267/140; 267/141.1; 267/141.2
[58] Field of Search .................................. 248/635, 560, 248/562, 568, 603, 634, 638; 267/140 R, 136, 293, 141, 141.1 R, 141.2 R

[56] References Cited

U.S. PATENT DOCUMENTS

| | | | |
|---|---|---|---|
| 2,126,704 | 8/1938 | Schmidt | 267/293 |
| 2,858,127 | 10/1958 | Moulton | 267/293 |
| 3,269,717 | 8/1966 | Beck | 267/141 |
| 3,831,920 | 8/1974 | Meldrum et al. | 267/493 |
| 3,948,500 | 4/1976 | Korbuly et al. | 267/140 |
| 4,741,521 | 5/1988 | Schiffner et al. | 267/141.2 |
| 5,024,425 | 6/1991 | Schwerdt | 248/562 |
| 5,054,414 | 10/1991 | Yamaguchi | 267/140 |
| 5,138,902 | 8/1992 | Müller et al. | 74/574 |

FOREIGN PATENT DOCUMENTS

| | | |
|---|---|---|
| 0 300 093 | 1/1989 | European Pat. Off. . |
| 0 425 473 | 5/1991 | European Pat. Off. . |
| 425473 | 5/1991 | European Pat. Off. ............ 267/141.2 |
| 2 228 396 | 11/1974 | France . |
| 2 520 072 | 7/1983 | France . |
| 934 800 | 3/1956 | Germany . |
| 29 33 586 | 2/1981 | Germany . |
| 33 35 069 | 4/1985 | Germany . |
| 37 24 963 | 2/1989 | Germany . |
| 39 37 669 | 9/1990 | Germany . |
| 2 008 714 | 6/1979 | United Kingdom . |

OTHER PUBLICATIONS

Patent Abstracts of Japan, vol. 012, No. 081 (N–676), Mar. 15, 1988 & JP 62–220736.

*Primary Examiner*—Ramon O. Ramirez
*Assistant Examiner*—Anita M. King
*Attorney, Agent, or Firm*—Y. Kurt Chang, Esq.; Leydig, Voit & Mayer, Ltd.

[57] ABSTRACT

A vibration damper comprises an attachment member and a damping mass connected by an elastomer spring with a plurality of elastic coupling elements. The coupling elements are inclined relative to the direction of the spacing between the damping mass and the attachment member. The inclination angle of the coupling elements is adjusted so that the natural vibrational frequency of the vibration damper in the spacing direction can be tuned largely independently from that in a direction perpendicular to the spacing direction.

14 Claims, 4 Drawing Sheets

VIBRATION DAMPER

This application is a continuation of Ser. No. 08/523,950 filed Sep. 6, 1995 now U.S. Pat. No. 5,884,892.

FIELD OF THE INVENTION

This invention relates to vibration damping devices for damping the vibration of a mechanical part, and more particularly to vibration damping devices having an inclined elastic coupling construction connected between the mechanical part and a damping mass.

BACKGROUND OF THE INVENTION

Mechanical parts in machinery often experience unwanted vibrations during operation. The undesirable vibrations can often be reduced substantially by vibration damping means. One type of vibration damping means uses a damping mass which is coupled with a spring to a mechanical part for damping the vibrations thereof. The damping mass and the mechanical part form a system of two elastically coupled masses. The mechanical part in this system is generally referred to as the main mass. In this vibrational system, an external excitation, such as a vibration, applied to the main mass will be transmitted to the damping mass via the elastic coupling. A special case is present when the natural vibrational frequency of the damping mass, which depends on the spring rigidity of the elastic coupling, is equal to the frequency of the excitation on the main mass. In that case, if there is no energy dissipation due to inelastic damping in the vibrational system, only the damping mass vibrates in opposite phase with respect to the excitation, and the vibration of the main mass is completely damped. In practical applications, however, there is almost always some inelastic damping. The effects of inelastic damping are that the vibration of the main mass is not completely damped, and that the effective damping frequency is broadened into a band around the natural vibrational frequency of the damping mass.

A vibration damping device of the type described above may be used, for example, in motor vehicles for reducing unwanted resonance vibrations of a main mass, such as a gear part or the body of the vehicle. In such applications the natural vibrational frequency of the damping device is tuned to the resonance frequency of the main mass. The vibration damping device can be used on machine components having different shapes, such as a generally flat shape or a generally cylindrical shape. An example of a machine component with a cylindrical shape is a rotary shaft.

A vibration damping device 31 known in the prior art is represented in FIGS. 7 and 8. This device 31 comprises a cylindrical fastening part in the form of a sleeve 32, and a cylindrical damping mass 33. The fastening part is used to connect the damping device to a cylindrical machine component, such as a shaft. The fastening part 32 and the damping mass 33 are coaxially arranged, and are connected together with an elastic coupling means in the form of an elastomer spring 34. The elastomer spring 34 as shown in FIGS. 7 and 8 comprises elastic coupling elements which are elastomer webs 35 with rectangular web surfaces. Opposed pairs of the webs are disposed in planes passing the axis of the cylindrical damping device.

The vibration damping device 31 can be used to reduce linear vibrations, such as bending vibrations, of a rotary machine component in either the axial direction or the radial directions. With radial vibrations the webs 35 are stressed for pressure, and with axial vibrations the webs are stressed for thrust. The pressure rigidity and thrust rigidity of a web of a given elastomer material generally has a fixed ratio, and in general the pressure rigidity is greater than the thrust rigidity. Since the natural vibrational frequencies of the damping mass depends on the rigidity of the coupling elements, the ratio of the natural vibrational frequencies of the damping mass in axial and radial directions is correspondingly fixed, and in general the natural vibrational frequency in a radial direction is higher than that in the axial direction. Due to this fixed ratio of natural vibrational frequencies, it is virtually impossible to tune the damping device 31 in the prior art to achieve simultaneous vibration damping in both the axial and radial directions. Thus the vibration damping device 31 can be optimally tuned for damping either axial or radial vibrations, but not both.

The above description of the vibration damping device 31 is mainly for illustrating the problem that prior art vibration dampers are generally optimized for one vibrational direction only. Most unwanted vibrations, however, have amplitude components in various directions. Such a case can be present, for example, in the case of a vehicle chassis which demonstrates a mixture of vibrations in all three dimensions in the resonance frequency range. Although it is sometimes possible to use several vibration damping devices on a machine component to handle vibrations in different directions, such an approach has the disadvantages of extra weight and high costs.

Other known constructions are described in, for example, German Patent 29 33 586, which discloses a vibration damping device which is provided for reducing rotary vibrations in radial directions. In order to make the vibration damping device relatively rigid with respect to torsional vibrations, the damping device has reinforcing elements in the form of sheet metal bodies.

German Patent 39 37 669 discloses a rotary vibration damper, the spring rigidity of which increases with increasing rotational speed. The adjustment of the spring rigidity is brought about by a centrifugal force adjustment of the spring elements.

SUMMARY OF THE INVENTION

In view of the foregoing, it is a general object of the invention to provide a vibration damper which can be constructed to have a preferred ratio of natural vibrational frequencies in at least two perpendicular linear vibrational directions. It is a more specific object of the present invention that the natural vibrational frequencies of the vibration damper in at least two perpendicular directions can be tuned to be substantially the same.

It is a related object that the method for tuning the natural vibrational frequencies of the damping mass can be applied to vibration dampers with different geometries, such as plane or cylindrical geometries.

It is another object of the invention that the method for adjusting the vibrational frequencies is simple and easy to implement. It is a related object that the natural vibrational frequencies or the vibration damper in two perpendicular directions can be tuned substantially independently from each other.

The above stated objects and other objects of the invention are achieved by providing a vibration damper having an attachment member and a damping mass connected together with elastic coupling elements. The coupling elements are inclined relative to the direction of the spacing between the attachment member and the damping mass. The degree of inclination of the coupling elements is chosen in such a way that the ratio of the natural vibrational frequencies of the damping mass in the spacing direction and in a direction perpendicular thereto has a predetermined value. By varying the inclination angle of the coupling elements, that ratio can be continuously adjusted over a wide range, including the often preferred value of one-to-one. Thus the method for tuning vibrational frequencies according to the present invention can be used to construct a vibration damper that is optimized for reducing vibrations simultaneously in different directions. It renders unnecessary the use of separate vibration damping devices for different vibrational directions, making possible a saving in weight and costs. This method for tuning the vibrational frequencies also allows adjustment of the natural vibrational frequency in the spacing direction substantially independent of the natural vibrational frequency in a direction perpendicular thereto.

A vibration damper according to the present invention can have different geometries, such as plane and cylindrical geometries. Because the vibrational frequency tuning according to the present invention can be implemented easily without the use of coupling elements with complicated shapes or structures, a vibration damper according to the present invention can have a very simple structure that can be constructed at low costs.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments, on the contrary, the intent is to cover all alternatives, modifications and equivalents included within the spirit and scope of the invention as defined by the appended claims.

A vibration damper according to the present invention comprises a damping mass, an attachment member, and elastic coupling elements for connecting the damping mass with the attachment member. The elastic coupling elements collectively constitute a spring, the rigidity of which determines the natural vibrational frequencies of the vibration damper.

It is an important feature of the present invention that the coupling elements are inclined relative to the direction of the spacing between the damping mass and the attachment member. The direction of the spacing is defined generally as the direction that yields the shortest path between the attachment member and the damping mass. For example, if the vibration damper has a plane geometry, with generally plane-shaped damping mass and attachment member arranged parallel to each other, then the spacing direction is the direction perpendicular to the plane surfaces of the damping mass and the attachment member. In this case the spacing direction is the same everywhere in the vibration damper. Alternatively the vibration damper may have a cylindrical geometry, with a cylindrical attachment member and a cylindrical damping mass arranged coaxially. In such a case the spacing direction at a point in the vibration damper is the radial direction at that point. obviously in a cylindrical damper the radial direction varies around the axis of the damper. There are therefore different "local" spacing directions.

Due to the inclined arrangement of the coupling elements, the spring rigidity in the spacing direction is no longer chosen to be that for pure pressure stressing. For example, if the spacing between the attachment member and the damping mass is reduced, the coupling element is compressed, and its inclination relative to the spacing direction is also increased. Thus a relative motion between the attachment member and the damping mass in the spacing direction causes the coupling element to undergo a combined pressure-thrust stressing. The effective rigidity of a coupling element for the combined pressure-thrust stressing is less than that in the case of pure pressure stress. By varying the inclination angle of the coupling element, the spring rigidity in the spacing direction can be tuned largely independently from the spring rigidity in a direction perpendicular to the spacing direction. Because most unwanted vibrations have amplitude components in various directions, it is often preferred that the inclination of the coupling element is chosen so that the natural frequencies of the damping mass in the spacing direction and in a direction perpendicular thereto are substantially the same.

Figure 1:
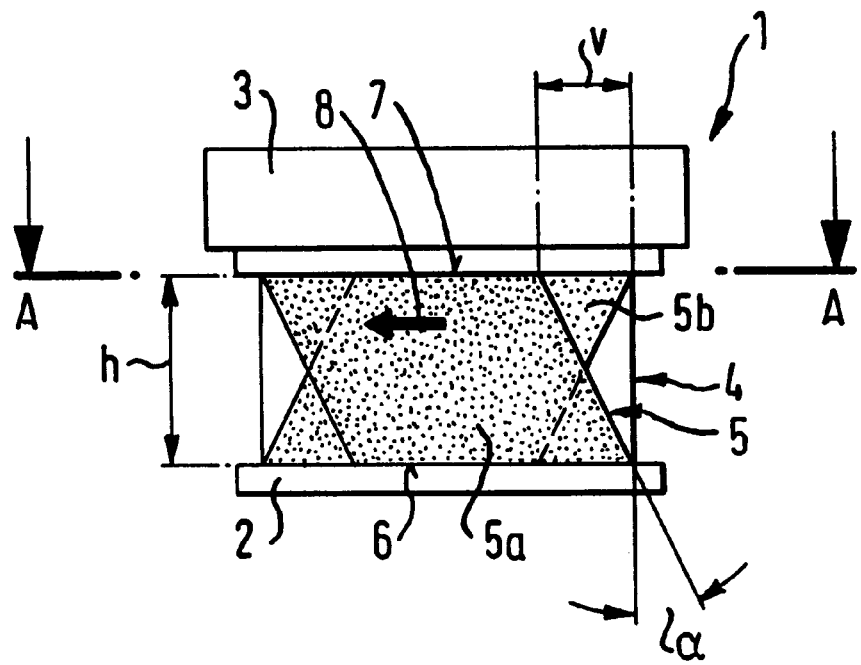
FIG. 1 is a side view of an embodiment of a vibration damper according to the present invention which has a generally plane geometry.

Turning now to the Figures, FIG. 1 shows a side view of an embodiment of a vibration damper 1 according to the present invention which has a generally plane geometry. The vibration damper comprises an attachment member 2 and a damping mass 3, both having the form of a plate. The attachment member 2 couples the vibration damper 1 to a machine component (not shown) with a flat surface for damping the vibrations thereof. The attachment member 2 and the damping mass 3 are arranged in a sandwich manner with an interposed elastomer spring 4. The damping mass 3 and the attachment member 2 are generally parallel to each other, and have approximately the same size. In the vibration damper 1 which has a plane geometry, the spacing direction runs perpendicular to the flat surfaces of the damping mass 3 and the attachment member 2.

The elastomer spring 4 comprises a plurality of coupling elements 5. The coupling elements according to this invention can have any form which permits an inclined arrangement. For example, the coupling element can have the form of a column. In the preferred embodiment as shown in FIG. 1, the coupling elements 5 are webs of an elastomer material, which preferably is rubber. The web form of the coupling elements allows the vibration damper to be constructed with high spring rigidity.

The inclination of a web relative to the spacing direction can be realized in two different ways. In the first way, the web is disposed in a plane tilted from the spacing direction. In the second way, the web is disposed in a plane parallel to the spacing direction. The inclination is achieved by shifting the web edge at the damping mass relative to the web edge at the attachment member along the longitudinal direction of the web. The webs 5 in FIG. 1 are of this type, with the web edges 6 and 7 shifted relative to each other. A web with shifted web edges can have an arbitrary quadrilateral form, provided that the center line of the quadrilateral runs at an inclination to the spacing direction. For example, it is possible to use webs having the shape of a scalene trapezoid. For reasons of symmetry, however, webs having essentially the shape of a parallelogram are used in the preferred embodiment, as shown in FIG. 1.

Figure 2:
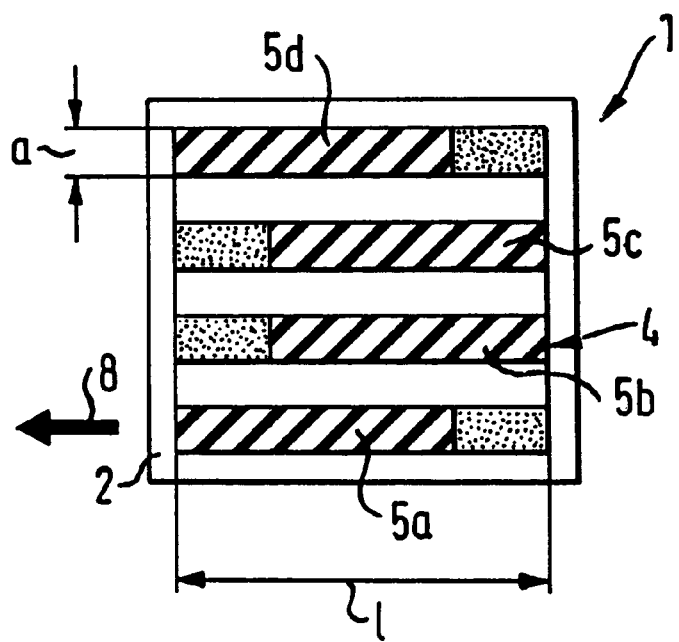
FIG. 2 is a cross-sectional view of the vibration damper of FIG. 1 along the line A—A in FIG. 1.

As described above, the inclination angle α of the webs 5 can be adjusted to achieve a given ratio between the vibrational frequencies in the spacing direction and in a direction perpendicular thereto. The inclination angle α may vary over a wide range, preferably between 5° and 70°. The angle α as shown in FIG. 1 is about 25°. The ratio of the height (h) of the web 5 to its width (a) (see FIG. 2) is preferably between 1 and 10, and is about 4 as shown in FIGS. 1 and 2. The ratio of the length (l) of the web 5 to its height (h) is preferably between 1 and 20, and is about 2 as shown in FIG. 1. Because of the parallelogram shape of the web 5, the web edge 7 at the damping mass is offset in the longitudinal direction of the web with respect to the web edge 6 at the attachment member 2. Depending on the inclination angle α, the offset of the web edges 6 and 7 may be so great that the projections of the web edges in the spacing direction may overlap only slightly, or not overlap at all. The web 5 may then resemble an obliquely positioned column. The ratio of the edge offset (v) to the web length (l) is preferably between 0.1 and 0.8. If the ratio is greater than 0.5, the projections of the web edges 6 and 7 in the spacing direction do not overlap. The ratio of the edge offset (v) to the height (h) of the webs in FIG. 1 is about 0.25.

Due to the inclined arrangement, the parallelogram-shaped webs 5 are stressed for pressure and thrust in response to a change in the spacing between the damping mass 3 and the attachment member 2, resulting in a lower spring rigidity in the spacing direction as compared to that of rectangular webs. Increasing the inclination angle increases the thrust component and correspondingly reduces the rigidity in the spacing direction. On the other hand, the rigidity in the longitudinal direction of the webs hardly changes with the inclination angle. It is thus possible to tune the rigidity in the spacing direction over a wide range independently from the rigidity in the longitudinal direction of the webs.

As described above, the inclined arrangement of the coupling elements allows adjustment of the spring rigidity in the spacing direction. However, the inclined arrangement of the coupling elements also tends to couple the vibrational motion in the spacing direction to that in the lateral direction. The lateral direction is defined as the direction which lies in the plane of the inclination angle and perpendicular to the spacing direction. In FIG. 1, the lateral direction of a web 5 is its longitudinal direction as denoted by the arrow 8. If there is only one inclined coupling element in the vibration damper, the vibrational degree of freedom in the spacing direction will be coupled to that in the lateral direction. In that case, excitations in the spacing directions will excite not only vibrations in the spacing direction but also vibrations in the lateral direction. In order to avoid such coupling of vibrational motions, preferably for each coupling element there is another coupling element with an opposite inclination. In this way the force component in the lateral direction generated by one coupling element will be canceled out by that of the other coupling element, so a vibration in the spacing direction no longer excites vibrations in the lateral direction. Thus the degrees of freedom in the spacing and lateral directions are decoupled.

FIG. 2 shows a cross-sectional view of the vibration damper 1 of FIG. 1 along the line A—A in FIG. 1. As shown in FIG. 2, the webs 5 are disposed in parallel planes which are also parallel to the spacing direction. The webs 5 are divided into pairs, each pair having two adjacent webs with opposite inclinations. For example, webs 5a and 5b form a pair, webs 5c and 5d form another pair. Thus for each web with an inclination angle α there is an adjacent web with opposite inclination angle -α. In FIG. 2, adjacent pairs of webs 5 are again oriented to have opposite inclinations, so that the arrangement of the webs 5 has a mirror symmetry about the middle plane of the vibration damper 1, with an inclination angle sequence of +α, -α, -α, +α. Through this symmetrical arrangement of pairs of oppositely inclined webs, the vibrational degree of freedom in the spacing direction is decoupled from that in the lateral direction. In an alternative embodiment two groups of webs are provided with the webs in one group disposed in parallel planes aligned in one direction and the webs in the other group disposed in parallel planes aligned in a perpendicular direction.

A vibration damper according to the present invention can also be executed in a cylindrical geometry, which can be used on rotary machine components, such as a shaft, for damping vibrations, such as bending vibrations caused by a rotary motion. In a vibration damper with a cylindrical geometry, the coupling elements can be inclined relative to the spacing direction, which is the radial direction in this case, in two different ways. In the first way, the inclination angle of the coupling element is in a plane defined by the axial direction and the radial direction. This type of inclination is referred to as axial inclination. In the second way, the inclination angle is in a plane perpendicular to the axis of the cylindrical geometry. This type of inclination is referred to as radial inclination. Either type of inclination can be used to tune the vibrational frequency of the damping mass in the spacing direction. It is also possible to use coupling elements with a combination of these two types of inclinations.

In a vibration damper with a cylindrical geometry, it is advantageous to use coupling elements in the form of webs, with the longitudinal direction of each web aligned in the axial direction. Advantageously the webs consist essentially of an elastomer material, which preferably is rubber.

Figure 3:
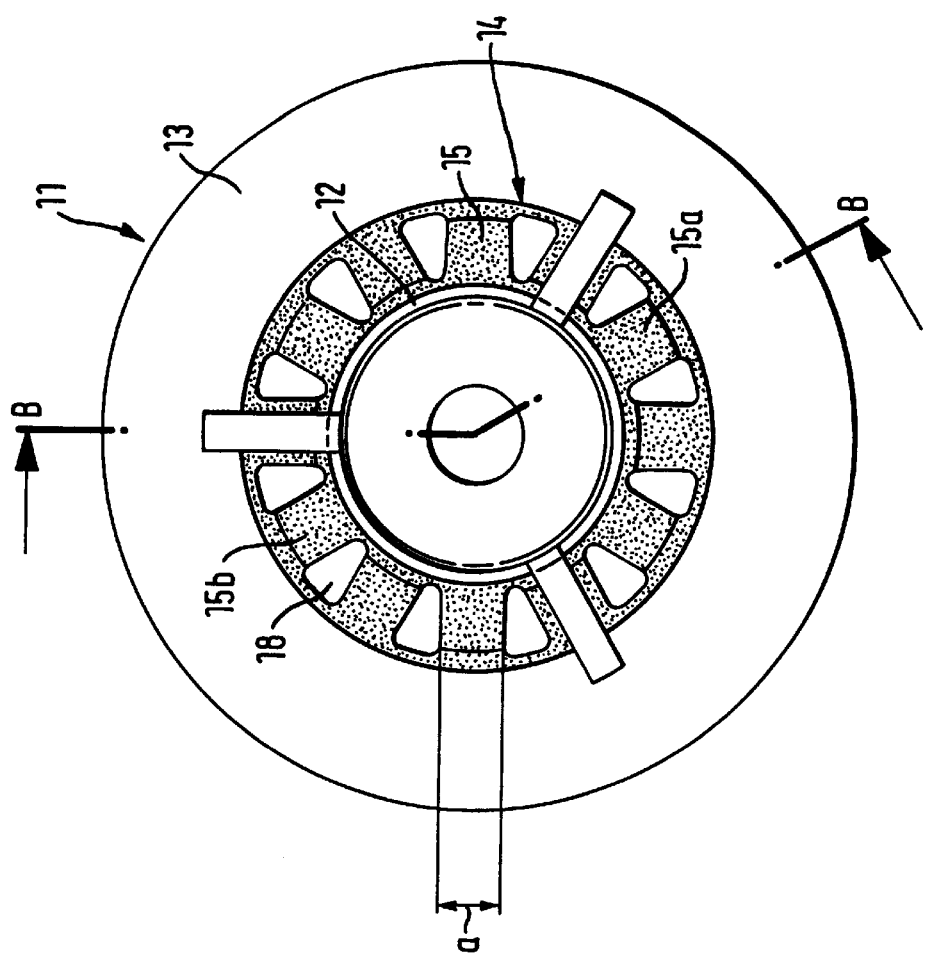
FIG. 3 is an axial cross-sectional view of an embodiment of a vibration damper according to the invention having a cylindrical geometry.

FIG. 3 shows an axial cross-sectional view of a cylindrical vibration damper 11 with webs 15 as coupling elements. Conceptually the cylindrical vibration damper 11 in FIG. 3 can be considered as being formed by winding the flat vibration damper 1 in FIGS. 1 and 2 around an axis parallel to the longitudinal directions of the webs 5. The vibration damper 11 has an attachment member 12 with an annular cross section surrounded by a damping mass 13 which also has an annular cross section. The attachment member 12 and the damping mass 13 are arranged to have a common cylindrical axis, with an interposed elastomer spring 14. The spacing direction in this cylindrical vibration damper 11 is the radial direction.

The spring 14 in FIG. 3 comprises webs 15 disposed in planes passing the cylindrical axis. The webs 15 are therefore arranged parallel to their respective radial directions.

Between the webs 15 are a plurality of spaced openings 18, each with a triangular or trapezoidal cross section. In addition to the elastomer webs 15, the elastomer spring 14 further comprises two cylindrical holding sleeves 19 and 20, also preferably fabricated of an elastomer material. The inner holding sleeve 19 surrounds the attachment member 12, and the outer holding sleeve 20 is attached to the inner surface of the damping mass 13. In an alternative embodiment, the attachment member 12 can be omitted, in which case the inner holding sleeve 19 is used for the purpose of attaching the damper to a machine component.

Figure 4:
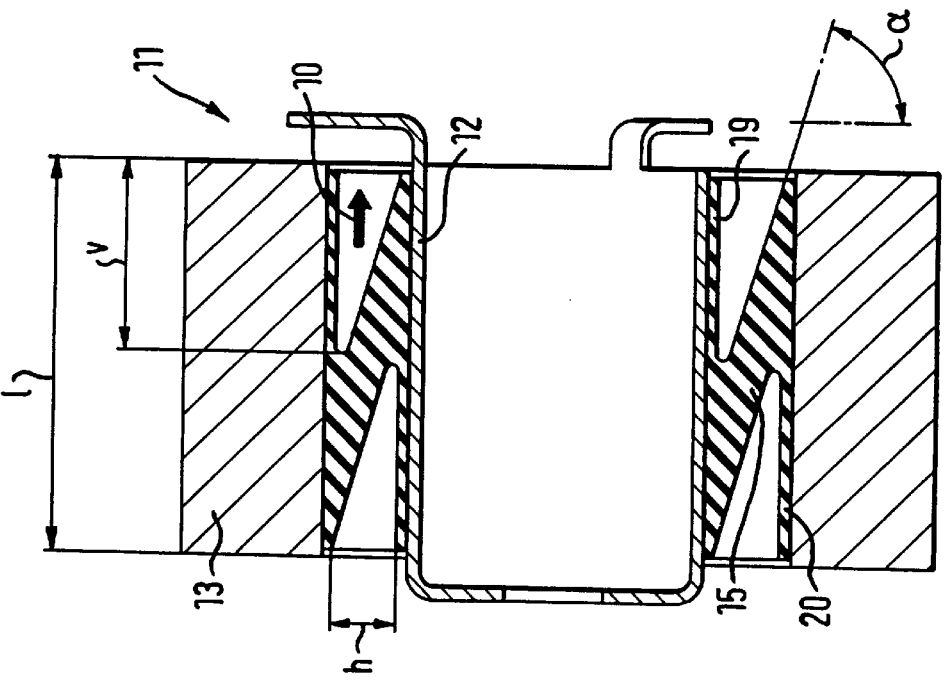
FIG. 4 is a cut-away view of the vibration damper of FIG. 3 along the line B—B in FIG. 3.

FIG. 4 is a cut-away view of the vibration damper 11 of FIG. 3 along the line B—B in FIG. 3. The webs 15 in this embodiment are axially inclined. As with the webs 5 in the plane-shaped vibration damper 1 in FIG. 1, the webs 15 in the cylindrical damper 11 in FIGS. 3 and 4 also have parallelogram-shaped side surfaces. However, the inclination angle α of the webs 15 in FIG. 4 is such that the inner and outer edges of a web 15 no longer overlap in the spacing direction. The ratio of the relative edge offset (v) to the web length (l) in FIG. 4 is about 0.5.

The lateral direction of an axially inclined web is its longitudinal direction as denoted by the arrow 10 in FIG. 4. In order to have vibrations in the radial directions decoupled from vibrations in the lateral direction, it is preferred that a plurality of coupling elements are used in the vibration damper, and that for each inclined coupling element there is another coupling element with opposite inclination so as to cancel the force components in the lateral direction. Due to the cylindrical geometry of the damper, the radial direction of one coupling element is different from the radial direction of an adjacent coupling element. Arranging adjacent coupling elements to have opposite inclinations, which is utilized in the plane geometry arrangement in FIG. 1, therefore does not completely decouple the vibrational motions. Decoupling can also be achieved if for each coupling element there is a radially opposed coupling element with an opposite inclination. Thus the webs, 15 in FIG. 3 are divided into pairs, with each pair comprising two radially opposed webs. The webs in each pair have opposite inclinations. One example of such a web pair is denoted as webs 15a and 15b in FIG. 3.

The preferred relative dimensions of the webs 15 in the cylindrical vibration damper 11 are generally the same as those of the webs in the plane embodiment shown in FIGS. 1 and 2. The ratio of the height (h) of the webs to the outer diameter of the attachment member 12 lies preferably between 0.05 and 1, and is approximately 0.4 in the embodiment shown in FIG. 4.

Due to the symmetry of a cylindrical vibration damper, its natural vibrational frequencies in all radial directions are generally the same. As in the case of the flat vibration damper in FIG. 1, it is possible to adjust the rigidity of the webs in the spacing direction, here the radial direction, over a wide range independently from the rigidity in the lateral direction. The natural vibrational frequency of the damper in the radial direction can be tuned to be substantially the same as that in the axial direction, which is the preferred arrangement in many applications.

Figure 5:
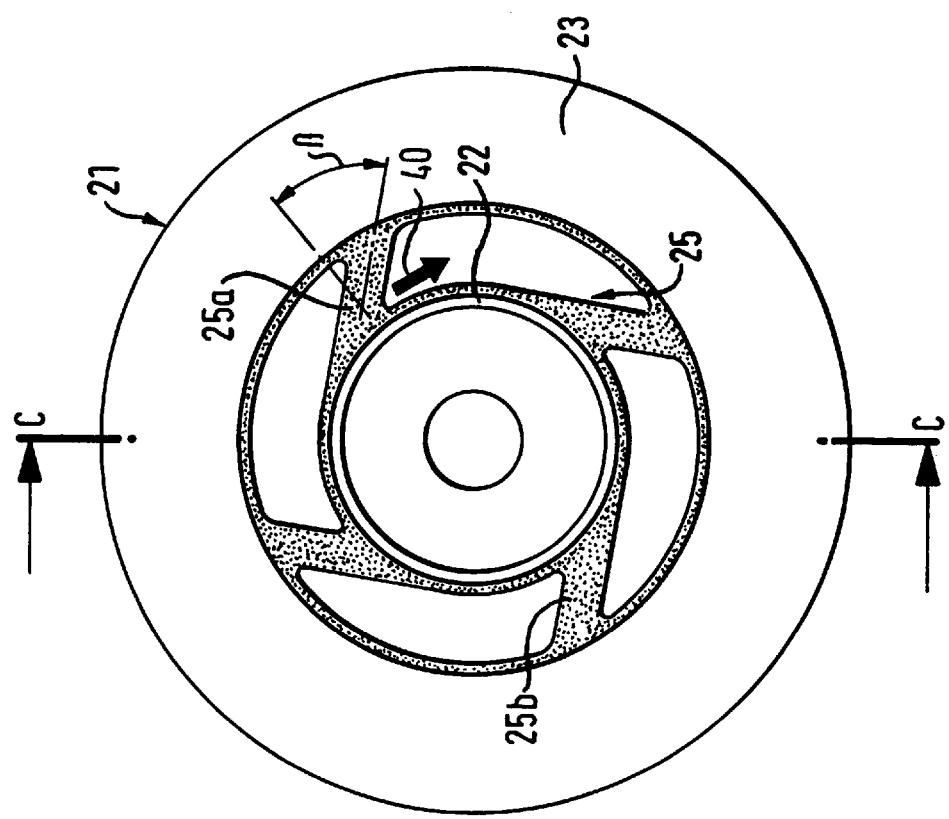
FIG. 5 is an axial cross sectional view of an alternative embodiment of a vibration damper with a cylindrical geometry.
Figure 6:
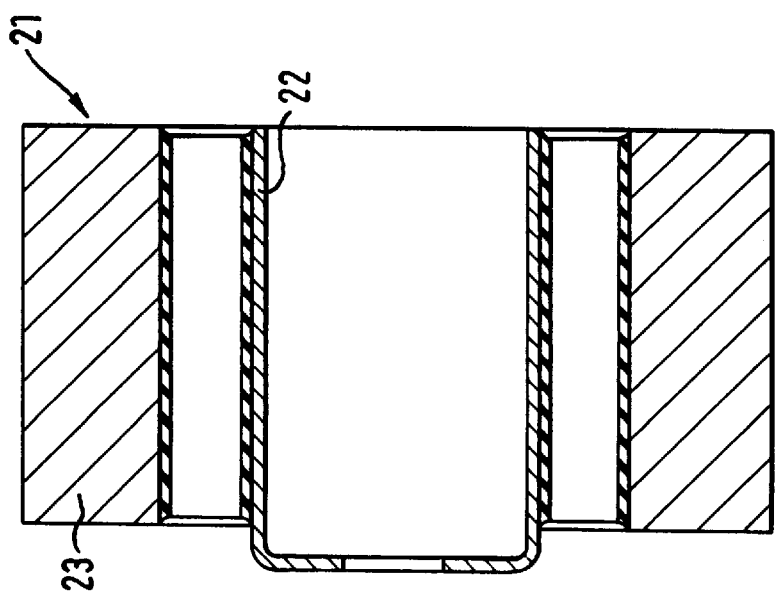
FIG. 6 is a cross sectional view of the vibration damper of FIG. 5 along the line C—C in FIG. 6.
Figure 7:
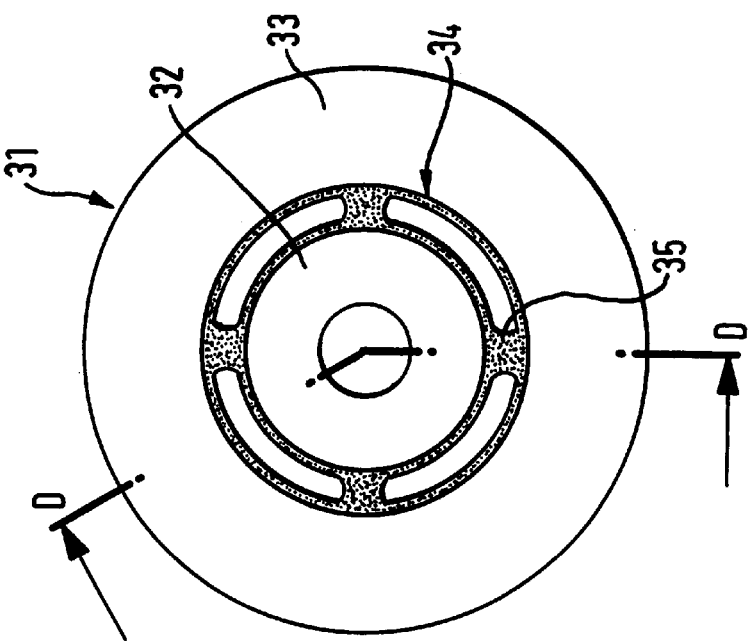
FIG. 7 is a cross sectional view of a cylindrical vibration damping device known in the prior art.
Figure 8:
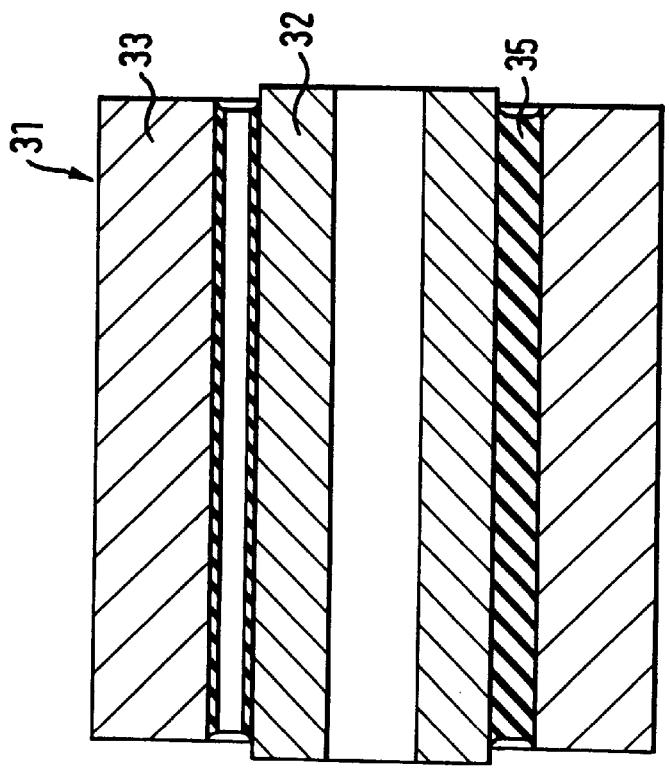
FIG. 8 is a cut-away view of the vibration damping device of FIG. 7 along the line D—D in FIG. 7.

As indicated above, the coupling elements in a cylindrical vibration damper can also have radial inclinations. FIG. 5 shows a cylindrical vibration damper 21 with radially inclined webs 25 as coupling elements coupling a damping mass 23 and an attachment member 22. The webs 25 are disposed with their longitudinal directions parallel to the damper axis. The inclination of the webs 25 is achieved by tiling the web planes away from their respective radial directions. The inclination angle β of a web 25 in FIG. 5 is thus in a plane perpendicular to the axis of the vibration damper 21. The webs 25 differ from the webs 15 in FIG. 3 in that the side surfaces of the webs 25 are rectangular instead of parallelogram-shaped. The tilting angle β is preferably between 5° and 90°, and is about 40° as shown in FIG. 5. In this embodiment all the webs have the same tilting angle. A cross sectional view of this embodiment along the line C—C in is shown in FIG. 6.

Due to the radial inclination of the webs 25, a single web would couple the vibrational degree of freedom in its radial direction to that in the lateral direction, which in this case is the circumferential direction. For example, the lateral direction for the web 25a in FIG. 5 is denoted by the arrow 40. In order to decouple the vibrational degrees of freedom, a plurality of webs are used. The webs 25 in FIG. 5 can be viewed as comprising pairs of radially opposed webs. For example, the web 25a forms a pair with the web 25b. The webs 25a and 25b have the same inclination angle β with respect to their own spacing directions. However, because the spacing directions of these two webs 25a and 25b differ by 180°, they are actually oppositely inclined. Thus the torques about the cylindrical axis generated by the two webs are effectively canceled. In this way the vibrational degrees of freedom are decoupled. In an alternative embodiment, the elastomer spring is subdivided into several sections along the length of the vibration damper, with the tilting angle in one section being opposite to that in an adjacent section. By adjusting the tilting angle, the radial rigidity of the elastomer spring can be adjusted largely independently from of its axial rigidity.

A vibration damper constructed with a predefined ratio of the natural vibrational frequencies in the spacing direction and in a direction perpendicular thereto has thus been described. The vibration damper has a damping mass, an attachment member, and an elastomer spring comprising a plurality of elastic coupling elements. The rigidity of the spring in the spacing direction can be adjusted according to the present invention by varying the inclination angle of the coupling elements relative to the spacing direction. In this way the spring rigidity in the spacing direction can be varied over a wide range largely independently from the rigidity in other perpendicular directions. Thus a vibration damper can be constructed according to the present invention to have the same natural vibrational frequency in all vibrational directions. The invention also provides a vibration damper with different geometries, such as plane or cylindrical geometries, for use on mechanical parts of different shapes. In the preferred embodiment the coupling elements have the form of webs. Because of the simple shapes of the webs, a vibration damper of this invention can have a simple structure and low construction costs. In order to decouple the vibrational degrees of freedom in different directions, the coupling elements can be formed in pairs, with the coupling elements in each pair having opposite inclinations.

What is claimed is:

1. A mass vibration damper for damping the vibration of a mechanical part which forms a main mass and has a resonant vibrational frequency, comprising:

an attachment member for attaching the mass vibration damper to the main mass;

a damping mass spatially separated from the attachment member, the spacing between the damping mass and the attachment member defining an axial direction and at least one radial direction perpendicular to the axial direction;

means for elastically connecting the damping mass to the attachment member to support the damping mass for vibration at a first natural vibrational frequency in the axial direction and a second natural vibrational frequency in the radial direction, at least one of said first and second natural vibrational frequencies being tuned for matching the resonant vibration frequency of the main mass for allowing transfer of vibrational energy to the damping mass for providing vibration damping by exciting vibration of the damping mass.

2. A mass vibration damper as in claim 1, wherein said means for elastically connecting includes a web member inclined in the axial direction.

3. A mass vibration damper as in claim 2, wherein the web member has first and second edges connected respectively to the attachment member and the damping mass.

4. A mass vibration damper as in claim 3, wherein the web member is disposed with a longitudinal direction perpendicular to the radial direction, and the first and second edges of the web member are offset along the longitudinal direction to achieve the inclination of the web member.

5. A mass vibration damper as in claim 4, wherein the web member is substantially parallelogram shaped.

6. A mass vibration damper as in claim 5, wherein the first and second edges of the web member at least partially overlap when projected in the radial direction.

7. A mass vibration damper as in claim 1, wherein said means for elastically connecting includes a plurality of web members each inclined in the axial direction, and wherein to each inclined web member there is allocated another web member with an opposite inclination.

8. A mass vibration damper as in claim 7, wherein the plurality of web members are divided into pairs, the web members in each pair being adjacent to each other and having opposite inclinations.

9. A mass vibration damper as in claim 1, wherein each of the attachment member and the damping mass has a generally cylindrical shape, the attachment member and the damping mass being arranged substantially coaxially, and wherein said means of elastically connecting includes a plurality of web members interposed between the attachment member and the damping mass, each web member being axially inclined.

10. A mass vibration damper as in claim 9, wherein each of the attachment member and the damping mass has an annular cross-section.

11. A mass vibration damper as in claim 9, wherein the web members are also radially inclined.

12. A mass vibration damper as in claim 9, wherein the web members are of an elastomer material.

13. A mass vibration damper as in claim 12, wherein the elastomer material is rubber.

14. A method for damping the vibration of a mechanical part which forms a main mass and has a resonant vibrational frequency, comprising the steps of:

positioning a damping mass at a spacing from the main mass, the spacing defining an axial direction and at least one radial direction perpendicular to the axial direction;

elastically connecting the damping mass to the attachment member to support the damping mass for vibration at a first natural vibrational frequency in the axial direction and a second natural vibrational frequency in the radial direction, at least one of said first and second natural vibrational frequencies being tuned to match the resonant vibration frequency of the main mass to allow transfer of vibrational energy from the main mass to the damping mass to reduce vibration of the main mass by exciting vibration of the damping mass.

* * * * *